(12) United States Patent
Yuan et al.

(10) Patent No.: US 6,485,386 B2
(45) Date of Patent: Nov. 26, 2002

(54) TRANSVERSE REINFORCED CVT BELT

(75) Inventors: Jing Yuan, Rochester Hills, MI (US); Leslee Brown, Westminster, CO (US); Alexander Serkh, Troy, MI (US); Scott Ciemniecki, Birmingham, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/858,690

(22) Filed: May 16, 2001

(65) Prior Publication Data

US 2001/0044354 A1 Nov. 22, 2001

Related U.S. Application Data

(60) Provisional application No. 60/205,052, filed on May 18, 2000.

(51) Int. Cl.[7] ................................. F16G 1/04
(52) U.S. Cl. ...................... 474/268; 474/205
(58) Field of Search ........................ 474/202, 204, 474/205, 268, 271

(56) References Cited

U.S. PATENT DOCUMENTS

| | | | |
|---|---|---|---|
| 1,982,869 A | 12/1934 | Heyer | 154/4 |
| 3,772,929 A | 11/1973 | Redmond, Jr. | 74/231 C |
| 4,053,547 A | 10/1977 | Redmond, Jr. | 264/102 |
| 4,298,343 A | 11/1981 | Redmond, Jr. | 474/255 |
| 4,493,681 A | 1/1985 | Takano | 474/265 |
| 4,627,828 A * | 12/1986 | Nagai et al. | 474/205 |
| 4,741,726 A | 5/1988 | Zarife et al. | 474/268 |
| 4,781,658 A | 11/1988 | Takano et al. | 474/91 |
| 4,799,919 A * | 1/1989 | Kozachevsky et al. | 474/205 |
| 4,846,771 A | 7/1989 | Kozachevsky et al. | 474/268 |
| 4,861,323 A * | 8/1989 | Kobayahi et al. | 474/260 |
| 4,934,992 A | 6/1990 | Simon et al. | 474/268 |
| 4,994,000 A * | 2/1991 | Simon et al. | 474/265 |

FOREIGN PATENT DOCUMENTS

| DE | 197 47 173 A 1 | 10/1997 | F16G/1/00 |
|---|---|---|---|

OTHER PUBLICATIONS

DE 197 47 173 A1 German Translation of Published Application Filed Oct. 24, 1997, Applicant; Teichfischer, Gunther, 29459 Clenze, DE.

* cited by examiner

Primary Examiner—David A. Bucci
Assistant Examiner—Timothy McAnulty
(74) Attorney, Agent, or Firm—J. A. Thurnau, Esq.; C. H. Castleman, Esq.; S. G. Austin, Esq.

(57) ABSTRACT

The invention comprises a cog type belt having a plurality of transverse teeth on an inner surface. The belt comprises an outer extensible elastomeric layer, an inner compression layer and a tensile member. Each tooth further comprises a non-metallic or plastic transverse member, pillar or rod that extends across the width of each tooth. The opposing outer surfaces of each transverse member are inclined to each other and each end approximately equates to an outer surface of the belt body elastomeric. A compressive load between the sheaves is carried by the rod and the sidewall in proportion to the modulus of each component. The transverse members have pegs or legs that allow proper spatial orientation of each transverse member in each tooth during the fabrication process, thus assuring proper operating characteristics, including proper alignment within a pulley.

8 Claims, 3 Drawing Sheets

TRANSVERSE REINFORCED CVT BELT

This application claims benefit of Ser. No. 60/205,052 filed May 18, 2000.

FIELD OF THE INVENTION

This invention relates to belts used in continuously variable transmissions ("CVT"), and more particularly to side drive CVT belts comprising cogs or teeth having transverse reinforcement.

BACKGROUND OF THE INVENTION

It is well known in the art that a gear type transmission may be used for running a motor vehicle, motorcycle or the like. However, gear type transmissions generally have a fixed number of gears. They are usually designed to operate most efficiently in one of the gears, leaving the others to cause the engine to run at less efficient operating points. Consequently, for the purpose of improving efficiency a continuously variable transmission, CVT, is preferable. Various types of belts have been developed for use in continuously variable transmissions.

Generally, the CVT Belts have a silhouette similar to that of a conventional V-belt. In particular, they are broad at the top and narrow at the bottom and designed to fit between the sheaves of a pulley defining an angular groove. The pulley on which the belt is trained comprises a moveable sheave and a fixed sheave, both having a truncated cone shape. Generally, one of the sheaves moves while the other remains fixed.

Moving one sheave in relation to the other varies the effective diameter $\phi$ of the pulley within which the belt operates. Belt speed is a function of the effective diameter of the pulley which is in turn a function of the axial position of the sheaves relative to each other.

CVT type belts in the prior art include belts comprising a plurality of blocks mounted transversely on a tensile member as well as monolithic metal belts and elastomeric belts. Certain forms of cog type belts are also known.

Representative of the art is U.S. Pat. No. 4,493,681 to Takano. Takano discloses a V-section cog belt having rigid metal reinforcing members in each cog extending transversely across the belt. The metal reinforcing members provide transverse rigidity to the belt.

Since the Takano belt operates in contact with the sheaves of the CVT pulley, it is desirable to reduce wear between the belt sides and the pulley as much as possible. This reduces heating, which enhances belt life. Metal rods in direct contact with the sheaves, as taught in Takano, cause undue heating and wear between the belt sides, the reinforcing rods and the pulley sheave surfaces. The use of metal rods also increases the rotating mass and cost of the belt. Further, during fabrication the rods may become misaligned in each tooth. This will cause some of the rods to bear a disproportionately higher load than the adjacent rods. This may result in premature failure. of the overloaded rods and eventually the belt.

Further representative of the art is German patent application DE 197 47 173 A1. It discloses a toothed elastomeric v-belt having transverse teeth. Each tooth having a transverse bore. Each bore may contain tube sections or bar sections. The bore provides a path for cooling air flow through the tooth. However, such bores decrease the compressive strength of each tooth. The application is appropriate for synchronous pulley systems wherein the belt teeth cooperate with conjugate surfaces in a pulley or pulleys.

What is needed is a transverse reinforced CVT belt having a non-metallic or thermoplastic, thermoset or composite transverse reinforcing member in each tooth. What is needed is a transverse reinforced CVT belt having alignment pegs on each transverse reinforcing member. What is needed is a transverse reinforced CVT belt having transverse reinforcing members with sufficient stiffness in the anticipated temperature range. What is needed is a transverse reinforced CVT belt having transverse reinforcing members with a low mass density. The present invention meets these needs.

SUMMARY OF THE INVENTION

The primary aspect of the invention is to provide a transverse reinforced CVT belt having a thermoplastic, thermoset or composite transverse reinforcing member in each tooth.

Another aspect of the invention is to provide a transverse reinforced CVT belt having centering pegs on each transverse reinforcing member.

Another aspect of the invention is to provide a transverse reinforced CVT belt having transverse reinforcing members with sufficient stiffness in the anticipated temperature range.

Another aspect of the invention is to provide a transverse reinforced CVT belt having transverse reinforcing members with a low mass density.

Other aspects of the invention will be pointed out or made clear by the following description of the invention and the accompanying drawings.

The invention comprises a cog type belt having a plurality of transverse teeth on an inner surface. The belt comprises an outer extensible elastomeric layer, an inner compression layer and a tensile member. Each tooth further comprises a non-metallic or plastic transverse member, pillar or rod that extends across the width of each tooth. The opposing outer surfaces of each transverse member are inclined to each other and each end approximately equates to an outer surface of the belt body elastomeric. A compressive load between the sheaves is carried by the rod and the sidewall in proportion to the modulus of each component. The transverse members have pegs or legs that allow proper spatial orientation of each transverse member in each tooth during the fabrication process, thus assuring proper operating characteristics, including proper alignment within a pulley.

DETAILED DESCRIPTION OF THE PREFERRED EMBODIMENT

Figure 1:
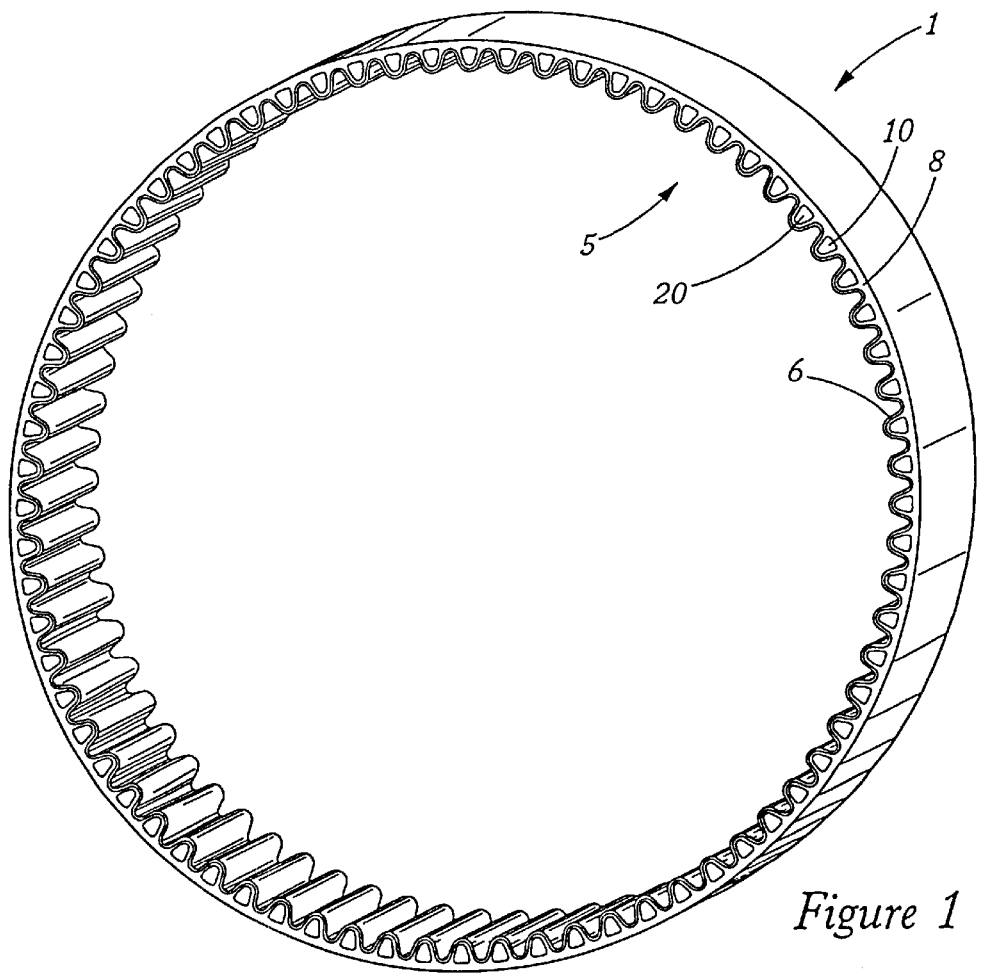
FIG. 1 is a side perspective view of the invention.

FIG. 1 is a side perspective view of the invention. Belt 1 is shown having a plurality of teeth 5 projecting from an inner portion or surface. The curved shape of each tooth enhances flexibility of the belt. Each tooth having a transverse pillar or rod 10 embedded therein. The belt fabrication process requires each transverse rod to be properly placed and then molded into the overall belt tooth structure. The fabrication process is enhanced by the shape of each rod as well as other attributes described in the following figures. The belt inner surface comprises jacket 6. Jacket 6 may comprise woven, non-woven or knit fabrics of polyester, polyamide, polyaramid, cotton, or acrylic fibers or blends thereof, and adhesive treatments appropriate for bonding the fabric to the extensible layer, to the cord, and to the rod. The jacket is preferably a woven or knit stretch fabric for ease in filling the mold and forming the a tooth contour.

Belt 1 also comprises extensible layer 8 which is a rubber compound comprising an elastomeric such as EPDM (ethylene-propylene diene rubber), HNBR(hydrogenated acrylonitrile-butadiene rubber), PU(polyurethane), ACSM (alkylated chlorosulfonated polyethylene), CR(chloroprene rubber), SBR(styrene-butadiene rubber), NBR(nitrile rubber) or blends thereof, and various fillers, antioxidants, curatives and/or short reinforcing fibers as is known in the art. Preferably, a heat resistant elastomer such as EPDM or HNBR is used.

Figure 10:
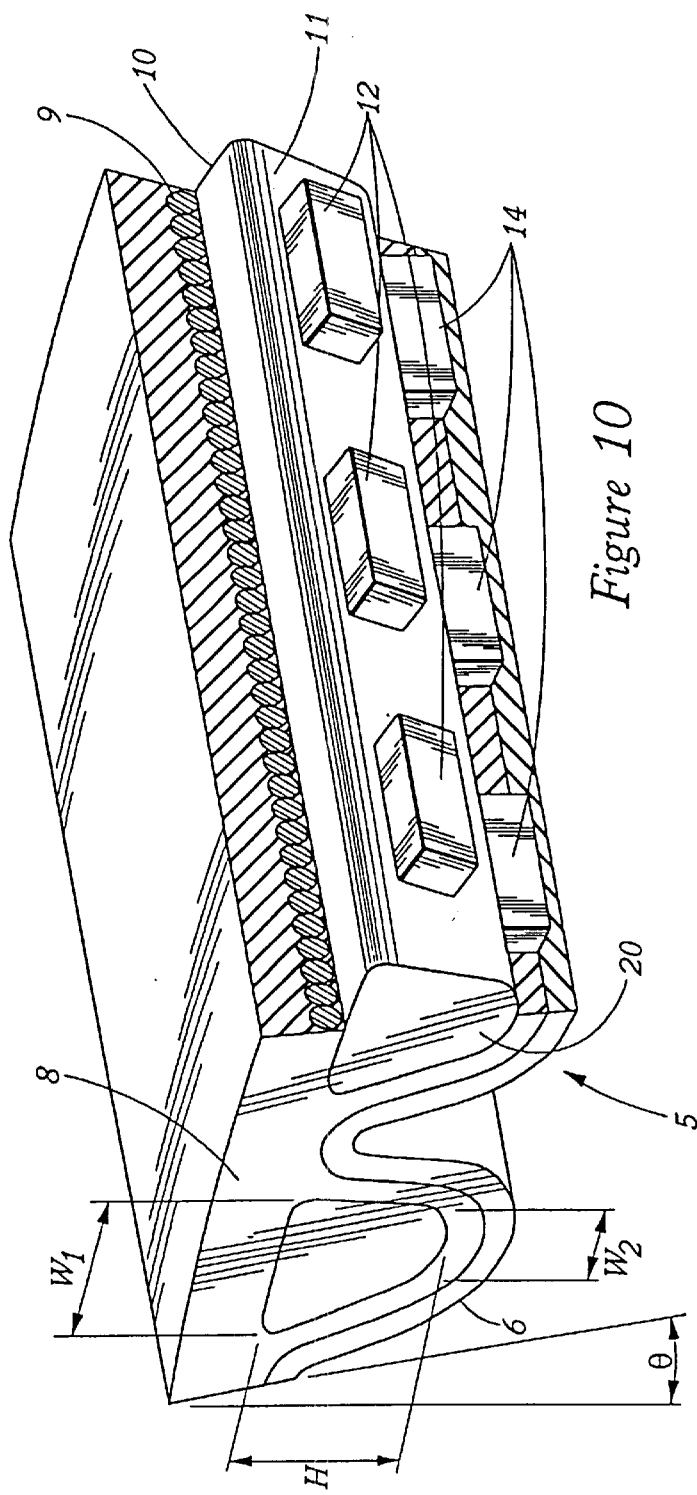
FIG. 10 is a perspective sectional view of a belt.

Tensile members 9, see FIG. 10, are embedded within extensible layer 8 over each rod. Each tensile member may comprise twisted or braided cords of organic fibers such as polyaramid, polyester, polyamide, or PBO, or inorganic fibers such as steel, glass, or carbon. Preferably, a high strength, high modulus cord material such as polyaramid, PBO, carbon or glass is used.

Tensile members serve to carry a tensile load during operation as well as properly holding each rod or pillar in place during the fabrication process. An adhesive layer known in the art, not shown, may also overlay and/or underlay the tensile members or the tensile members may be embedded within an adhesive layer.

Figure 2:
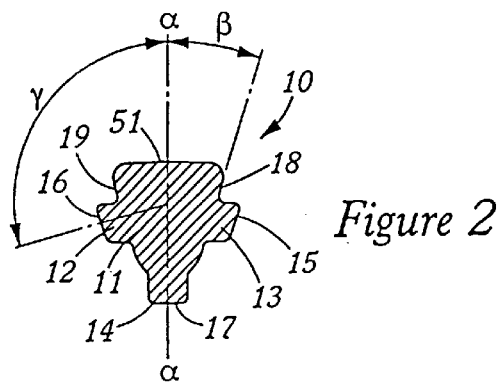
FIG. 2 is an end elevation view of a molded rod assembly.

FIG. 2 is an end elevation view of a molded rod assembly. The rod may be injection molded, poltruded, or thermally formed. For example, PEEK® material may be used to form the rod. PEEK is polyaryletherketone high performance polymer. Reaction injection molding (RIM) can provide a part with up to 30% more strength than the same part manufactured from an extrusion process.

Rod or pillar assembly 10 comprises legs or pegs 12, 13, and 14 projecting radially or extending from the rod body 11. Leg 14 has surface 17, which surface is substantially similar in shape to the outer surface of a tooth, not shown. Surface 15 of peg 13 and surface 16 of peg 12 are each inclined at an angle β from a rod axis α—α. Surfaces 18, 19 are also inclined at an angle β from axis a—a. Upper surface 51 may describe an arc or be flat. This allows the rod to properly support the tensile members 9 as the belt proceeds through a pulley.

The legs or pegs allow the rod to be spatially positioned in the tooth during the fabrication process in a mandrel. The mandrel has a series of parallel concave surfaces. Each concave surface comprising a position where each tooth if formed. During fabrication, an outer film or fabric layer is first laid about the mandrel and within each concave surface. A rod is then placed within each concave surface. Each rod peg is placed upon the outer film or fabric layer so the rod is aligned at a predetermined pitch line diameter. This also assures that the inclined end surfaces of each rod will properly contact the sheave surface during operation. A tensile cord is then wound around the mandrel, over a back side of each rod. A series of elastomeric ply's are then wound over the tensile cords. At this step an adhesive layer may also be applied over the tensile cords if required by a user.

The entire belt build is then subjected to heat and pressure in a manner known in the art. Once the belt built is cured, it is removed from the mandrel and square cut to predetermined widths, for example 38 mm. A width of 38 mm is offered by way of example and not of limitation. Other widths are possible, limited only by the needs of the user.

Once cut, the belt sidewalls are ground to the proper angle, in most cases 13°, although any angle may be cut by a user. Only the sidewalls are profiled, the top of the belt is square cut to protect the tensile cords.

An alternate method of fabrication comprises reaction injection molding. First a laminated preformed fabric is formed. This is formed in the shape of the teeth or cogs. The preformed fabric is then wrapped around a mandrel. The mandrel has a series of parallel grooves corresponding to the teeth in the fabric. Once the fabric is wrapped around the mandrel, the rods are placed in the grooves which will become the teeth of the belt. Tensile cord is then wrapped around the mandrel. The cord bears upon each rod to hold it in place. The prepared mandrel is then placed in the RIM machine and urethane is injected by methods known in the art. Once the process is complete, the mandrel is removed from the RIM machine and the belt build is removed from the mandrel. The belt build is then cut to width as required by a user.

Figure 3:
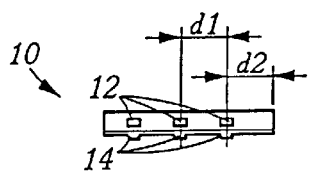
FIG. 3 is a side elevation view of a molded rod assembly.

FIG. 3 is a side elevation view of a molded rod assembly. Pegs 12 and 14 are spaced at a centerline distance d1 from each adjacent peg. The centerline of each peg is spaced from an end of the rod 10 at distance d2. Although the preferred embodiment depicts the pegs arranged in a pattern that is coaxial with respect to a normal to a major axis, such an arrangement is not required for proper operation of the invention. That is, each row of pegs may be staggered with respect to any other row of pegs. The primary function of the legs is to position the rod during fabrication as described in FIG. 2, although they do serve a structural purpose after fabrication by providing mechanical adhesion. The pegs also allow the tensile members to be preloaded against each rod as the are wound, thereby preventing any movement of a rod in a tooth during the heat and stresses of operation. Any arrangement of the pegs that results in proper alignment of a rod or pillar within each tooth during fabrication is acceptable. Of course, it is preferable that a minimal number of pegs per rod be used to reduce the cost of the belt as well as the mass of the belt. Each rod has a cross-sectional shape generally describing a trapezoid.

Figure 4:
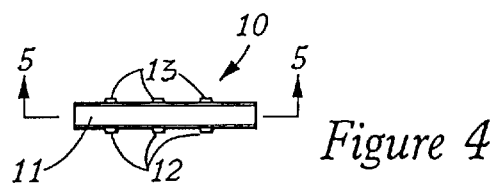
FIG. 4 is a top plan view of a molded rod assembly.

FIG. 4 is a top plan view of a molded rod assembly. Pegs or legs 12 and 15 are shown projecting from rod body 11. In the preferred embodiment, the legs are arranged to contact three sides of a tooth. At least two rows of pegs such as 12 and 13 would also serve to properly place a rod within a tooth. This would further reduce the mass of the completed belt.

Figure 5:
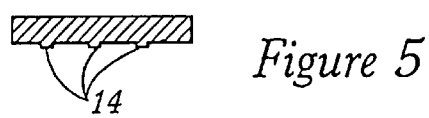
FIG. 5 is a sectional view of FIG. 4 through line 5—5.

FIG. 5 is a view of FIG. 4 through line 5—5. A typical value for d1 is 11.75 mm. A typical value for d2 is 11.86 mm. The overall length of a rod 10 may be on the order of 236 mm, which is then cut into parts of equal length during fabrication of the belt. The foregoing values are offered by way of example and not of limitation.

Figure 6:
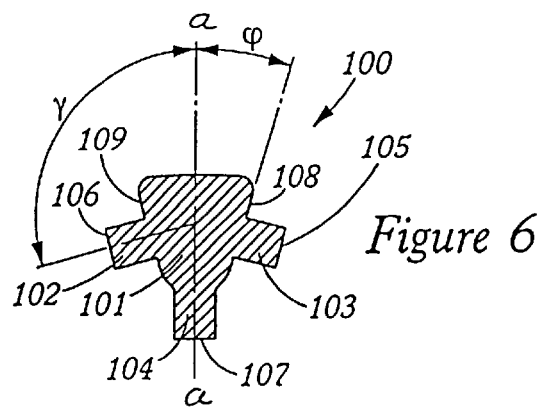
FIG. 6 is an end view of a machined rod assembly.

FIG. 6 is an end view of a machined rod assembly. Rod assembly 100 comprises legs or pegs 102, 103, and 104 extending from the rod body 101. Leg 104 has surface 107 which is substantially similar to the shape of the outer surface of the tooth, not shown. Surface 105 of peg 103 and surface 106 of peg 102 are each inclined at an angle ψ from a rod axis a—a. Surfaces 108, 109 are also inclined at an angle ψ from axis a—a. The machine rod may comprise metallic material. It may also comprise a metallic material over-molded with a thermoset, thermoplastic or composite material. A centerline of legs 102, 103 are inclined from axis a—a by an angle γ.

The legs or pegs position the rod in the tooth during the fabrication process. The fabrication process is the same as described for FIG. 2.

Figure 7:
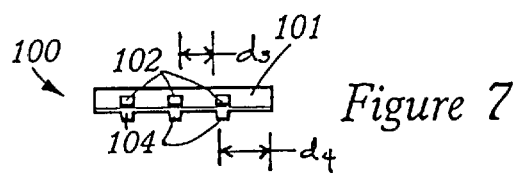
FIG. 7 is a side elevation view of a machined rod assembly.

FIG. 7 is a side elevation view of a machined rod assembly. Pegs 102, 103 and 104 are spaced at a centerline distance d3 from each adjacent peg. The centerline of an end each peg is spaced from an end of the rod 100 at distance d4. Although the preferred embodiment depicts the pegs arranged on a normal to a major axis, such an arrangement is not required for proper operation of the invention, that is, each row of pegs may be staggered with respect to any other row of pegs. The end of the rod may extend to the outer surface of the tooth that contacts the pulley surface. Further, since the primary function of the legs is to position the rod during fabrication, as described in FIG. 2, they do not serve a structural purpose after fabrication is complete. Consequently, any arrangement of the pegs that results in proper alignment of the rod in a tooth during fabrication is acceptable.

Figure 8:
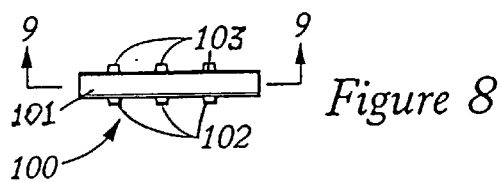
FIG. 8 is a top plan view of a machined rod assembly.

FIG. 8 is a top plan view of a machined rod assembly. Pegs or legs 102, and 105 are shown projecting from rod body 101. In the preferred embodiment, the legs or pegs are arranged to contact three sides of a tooth. However, two rows of pegs such as 102 and 105 would also serve to properly place a rod within a tooth. This would further reduce the mass of the completed belt.

Figure 9:
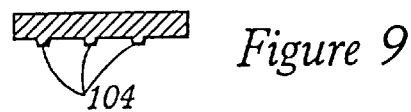
FIG. 9 is a sectional view of FIG. 8 through line 9—9.

FIG. 9 is a view of FIG. 8 through line 9—9.

FIG. 10 is a perspective sectional view of a belt. Rod 10 is shown molded within tooth 5. Each rod has a major width $W_1$, a minor width $W_2$ and a height H. Major width $W_1$ is greater than minor width $W_2$, creating a generally truncated triangular or trapezoidal shape. This minimizes the bending moment of the rod about the cordline when tangential loads are transmitted. This in turn allows the mass of each rod to be reduced where relatively increased strength is not required, that is at the inner portion of each tooth.

Tensile members 9 are arranged in the longitudinal direction of the elastomeric extensible layer 8 of the belt, running at a normal to the reinforcing rods 10. Legs 12, 14 bear upon the jacket 6 in order to spatially locate the reinforcing rod within the tooth. Proper location of each rod in each tooth results in enhanced belt life because each rod bears a proportionate part of the compressive load between the sheaves as the belt runs through the pulleys. However, misalignment or improper placement of the rods tends to resolve itself due to the elasticity of the components surrounding the rods. This tends to redistribute the stresses in that particular part of the belt. Stresses include mechanical effects (compressive and centripetal load) and thermal effects (heating from the operating environment, friction and vibration).

Each rod comprises a plastic or non-metallic substance the inclined end surfaces having a known and controllable frictional coefficient. This makes the sliding characteristic of the belt predictable. It also enhances the ability of the belt to ride radially within the pulley as the pulley sheave spacing is adjusted by a user. The controllable coefficient of friction also allows the frictional heating of the belt to be engineered, as well as enhancing noise and wear characteristics.

Once the rods shown in FIG.'S 3, 5, 7, 9 are incorporated into the structure of the belt as shown in FIG. 10, the sides 20, 21 are made, cut or ground to create the included side angle θ.

Figure 11:
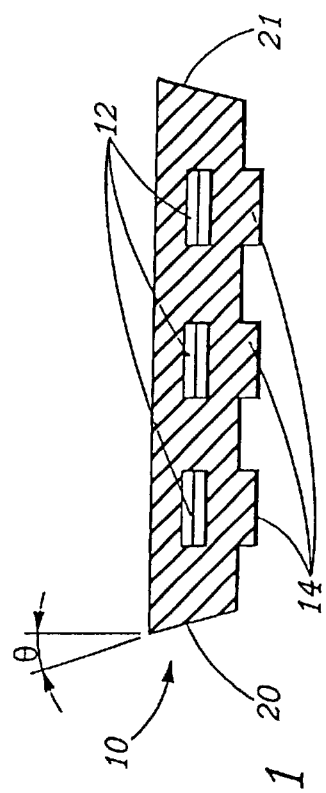
FIG. 11 is a side elevation view of a reinforcing rod.

FIG. 11 is a side elevation view of a reinforcing rod. Rod 10 comprises pegs 12, 14. The opposing inclined end sides 20, 21 are located at opposite ends of each rod. Angle θ is of a predetermined value in order to properly cooperate with a pulley sheave surfaces. Angle θ is in the range of 20° to 70°, although any known CVT pulley included angle is acceptable. In the preferred embodiment, the angle θ is equal to ½ of the included pulley angle in order to assure that the side 20, 21 bears upon the pulley sheaves surfaces.

Although a single form of the invention has been described herein, it will be obvious to those skilled in the art that variations may be made in the construction and relation of parts without departing from the spirit and scope of the invention.

We claim:

1. A belt comprising:
    a body portion having a longitudinal axis and an inner portion;
    a tensile member extending parallel to the longitudinal axis within said body;
    a plurality of teeth arranged along said inner portion and arranged transversely to said longitudinal axis;
    a reinforcing member extending transversely across each of said teeth; and
    at least two or more legs projecting radially from a centerline whereby a reinforcing member is spatially located within each of said teeth.

2. The belt as in claim 1 wherein the reinforcing member is non-metallic.

3. The belt as in claim 2, wherein each reinforcing member further comprises:
    opposing inclined surfaces having a predetermined angle.

4. The belt as in claim 3, wherein each reinforcing member further comprises a trapezoidal cross-sectional shape.

5. The belt as in claim 4, wherein the tensile member bears on an outer surface of each reinforcing member.

6. The belt as in claim 5, wherein the body further comprises:
    EPDM (ethylene-propylene diene rubber), HNBR (hydrogenated acrylonitrile-butadiene rubber), PU (polyurethane), ACSM (alkylated chlorosulfonated polyethylene), CR (chlorprene rubber), SBR (styrene-butodiene rubber), NBR (nitrile rubber) or blends thereof.

7. The belt as in claim 6, wherein the predetermined angle is in the range of 20° to 70°.

8. The belt as in claim 7 further comprising:
    a jacket covering said inner portion.

* * * * *